United States Patent [19]
Ebey

[11] 3,715,935
[45] Feb. 13, 1973

[54] WELD FIXTURE AND AXLE SHAFT INSTALLATION GUIDE

[75] Inventor: Edward W. Ebey, Roundlake, Ill.

[73] Assignee: International Harvester Company, Chicago, Ill.

[22] Filed: Oct. 12, 1971

[21] Appl. No.: 188,043

[52] U.S. Cl. .................................. 74/607, 301/131
[51] Int. Cl. ................................................ F16h 57/02
[58] Field of Search ............ 29/430, 434, 463, 463 X; 74/713, 607, 710, 674, 713, 56; 301/124, 125, 126, 131, 132; 64/3; 180/88, 75, 44

[56] References Cited

UNITED STATES PATENTS

| | | | |
|---|---|---|---|
| 2,776,583 | 1/1957 | Williams | 74/713 |
| 2,861,479 | 11/1958 | Muller | 74/713 |
| 3,198,036 | 8/1965 | Muller | 74/713 |
| 3,318,173 | 5/1967 | Puldokas | 74/713 |
| 3,385,133 | 5/1968 | Terao | 74/713 |
| 3,394,610 | 7/1968 | Szodfridt | 74/713 |
| 3,470,768 | 10/1969 | Ford | 74/713 |
| 3,593,595 | 7/1971 | Taylor | 74/713 |

Primary Examiner—Charles W. Lanham
Assistant Examiner—D. C. Crane
Attorney—Floyd B. Harman

[57] ABSTRACT

A cylindrical member which pilots a differential housing to an end spindle during the welding thereof. The member is positioned such that as the center of gravity of an axle shaft passes into the spindle end during installation thereof, the leading end of the shaft is supported by the member.

5 Claims, 1 Drawing Figure

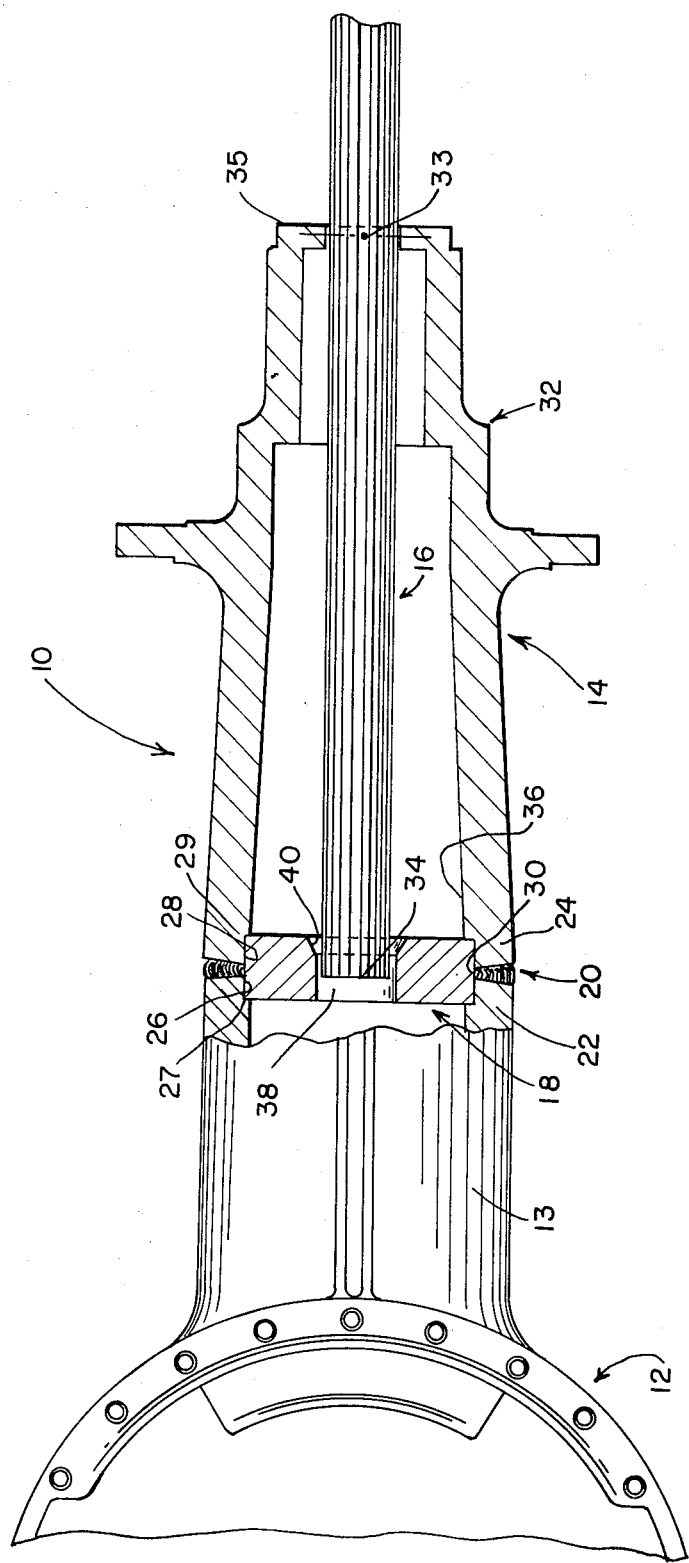
PATENTED FEB 13 1973
3,715,935

WELD FIXTURE AND AXLE SHAFT INSTALLATION GUIDE

BACKGROUND OF THE INVENTION

This invention relates to an axle housing assembly and more particularly to a member which pilots the differential housing to the end spindle during the welding process and functions as a guide and rest for the axle shaft during installation.

Methods of prefabricating an axle housing from a number of component parts with the subsequent installation of the axis shaft through the planetary end into the differential are known in the prior art. However, these methods are concerned with relatively light assemblies which require only a minimum amount of effort and equipment.

With the advent of gargantuan or heavy specialized machines weighing 150,000 lbs. and above, such as in the earth-moving industry, a problem has arisen in the assembly of axle housings which may weigh 4000 + lbs., employ in the range of 55 gallons of lubricant and contain axle shafts which weigh about 400 lbs. and above. In axle housings of this magnitude, reasonably priced mechanical devices must be relied upon to perform the functions previously performed by the builders. Formally, the builder could, with simple tools and by hand, align the components or install the axle shaft, for example, through the planetary end into the differential. However, when the center of gravity of an axle shaft weighing, as an example 400 lbs., passes into the planetary end, it becomes increasingly cumbersome. The problem of then keying this shaft into the differential gear set when only a short section is exposed for leverage purposes is obvious.

It is therefore an object of this invention to provide a member which guides an unwieldingly large axle shaft into the differential gear set.

Another object of this invention is to provide a member forming the bottom of a weld gap.

Another object of this invention is to provide an axle housing having reinforced sides.

Another object of this invention is to provide an axle housing having a member which engages the leading end of an unwieldingly large axle shaft as the center of gravity thereof passes into the housing.

Another object of this invention is to provide an axle housing which tends to insure a proper lubricant distribution therein and which retards the movement of oil therein.

Still another object of this invention is to provide a weld fixture which aligns the assembly and determines the size of the weld gap.

Yet another object of this invention is to provide a method for assembling axle housings.

BRIEF DESCRIPTION OF THE DRAWING

The FIGURE is a side sectional view of the axle housing embodying the invention and showing an axle shaft being installed through the planetary end.

DESCRIPTION OF THE PREFERRED EMBODIMENT

In the various views, like reference numbers designate like parts.

As shown generally in FIG. 1, the axle housing assembly 10 according to this invention includes a differential housing 12 having extensions 13, an end spindle 14, an axle shaft 16 and a weld fixture and shaft guide means 18.

In operation, the differential housing means 12 and the end spindle means 14 are cast as two independent components being united by a weld 20 joining adjacent ends 22 and 24 respectfully. In the ordinary axle assembly, this procedure is routinely performed, however, with very large axle assemblies, weight problems make the operation difficult as well as hazardous.

To avoid these problems, a weld fixture and shaft guide means 18 is interposed between extension 13 of the differential housing means 12 and end spindle means 14 in milled or turned sections 26 and 28. The sections 26 or 28 provide increased interior diameters forming shoulders 27 and 29 in the adjacent ends of the extension 13 and spindle 14. Once the fixture means 18 has been aligned with and abutted against either the differential housing section 12 or the spindle section 14, it is apparent that it serves as a pilot for junction with the other determining the dimensions of the weld gap 30, and when clamped by axially directed compressive forces, maintains the components in their proper relationship during the welding operation. It is further apparent that by varying the thickness of fixture means 18, the dimensions of the weld gap and the alignment of the components can be accurately controlled without the need of complicated external means.

The components are assembled providing a weld gap 30 such that the weld joins the extension 13 of the differential housing means 12, the fixture and guide means 18, and the end spindle means 14 as a single unit. Thus, the fixture end guide means 18 functions thereafter as a reinforcing member helping to distribute forces to which the axle assembly 10 may be subjected thereby strengthening the unit. A submerged arc process is employed wherein the gap 30 is filled with molten metal. The relationship between the wall thickness and washer thickness should be such that if the assembly bends, the washer is neither crushed nor does it force out one of the walls, that is, a uniform degree of strength between all of the components. The axle assembly is then mated with axle shaft means 16, the installation being made by the blind insertion of shaft 16 through the planetary end 32 and into the differential unit, (not shown).

The axle shaft 16, while the differential end 34 thereof is being inserted through the planetary end 32, is suspended in a sling positioned at its center of gravity 33. As so positioned, the shaft 16 is inserted until the sling buts against face 35 of planetary end 32. Further positioning is accomplished by sliding the axle forward in sling. As is apparent, as soon as the center of gravity 33 of the axle shaft 16 moves into the planetary end 32, end 34 would ordinarily tend to drag with more and more force on the axle housing's interior surface 36. The problems of so inserting an axle shaft weighing upwards of 400 lbs. and being about 7 feet long are obvious.

In practice, the differential housing means 12 and end spindle 14 are cast such that when assembled as above described, end 34 of axle shaft 16 is entering or is in aperture 38 of weld fixture and guide means 18 as the axle's center of gravity passes into planetary end 32. Thus, the axle shaft 16, by virtue of friction, is supported by the planetary end 32 and weld fixture and guide means 18, and also properly aligned by the latter. The task of further inserting axle shaft 16 is thereby eased and can be accomplished with greater speed and fewer problems.

As was stated prior, weld fixture and shaft guide means 18 functions as a reinforcing member, thereby little damage can be inflicted thereon by the builder while seeking to insert the axle shaft 16 through aperture 38. Further, means 18 is provided with only one aperture means, thus the builder need not probe during alignment as would be necessary with a multi-apertured guide means.

The weld fixture and axle shaft means 18 is, in the preferred embodiment, provided with a beveled edge 40 which facilitates the entrance of end 34 of axle shaft 16. Although the inner diameter of weld fixture and axle shaft means 18 is not such that it serves as a bearing, bowing or curving of axle shaft 16 is restricted. Further, it functions as a baffle preventing the rapid movement of lubricating oil from one side of the assembly to the other and from being driven out of the differential by the action of the gears. This baffling action thus tends to maintain the lubricant around the differential and planetary gear sets.

As stated previously, weld fixture and axle guide means 18 does not function as a bearing. If it were to function as a bearing, then axle shaft 16 would have three contact points, that is, contact with planetary end 32, contact with the bearing and contact with the differential 12. Due to the size and length of the components involved in this assembly, problems of alignment would become substantial, any misalignment resulting in excessive wear.

The invention may be embodied in other specific forms without departing from the spirit of essential characteristics thereof. The present embodiments, are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A gargantuan axle housing assembly for encasing an axle shaft and differential unit, comprising:
    a differential housing including an extension;
    an end spindle capable of mating with and forming a contiguous surface with said extension;
    the adjacent ends of said spindle and said extension having a section of increased interior diameter forming a shoulder in each of said spindle and extension; and
    a combined weld fixture and reinforcing member having a diameter complementary to the increased diameter sections and having a thickness such that, when clamped between said shoulders, said extension and said spindle are correctly aligned and oriented with respect to each other and said adjacent ends are spaced for welding said ends and said member as a unit.

2. An axle housing assembly according to claim 1, wherein:
    said member is a solid dish having a central opening capable of accepting the axle shaft therethrough;
    whereby said member can function as a baffle to reduce the movement of lubricant within the assembly and can promote proper distribute of the lubricant therein.

3. An axle housing assembly according to claim 2, wherein:
    said opening has a beveled edge on the side adjacent said spindle to facilitate the insertion of the axle shaft through said opening.

4. An axle housing assembly according to claim 3, wherein:
    said axle shaft has a differential end and a center of gravity at a given distance from said differential end; and
    said member is axially positioned within said assembly so that said differential end is within said opening when the axle shaft is positioned with its center of gravity located at the free end of said spindle.

5. An axle housing assembly for gargantuan equipment wherein the axle shaft is installed through the planetary end, comprising:
    a differential housing,
    an end spindle,
    a weld fixture and axle shaft installation guide interposed between said differential housing and end spindle and being welded to both, and
    an axle shaft having a center of gravity and a leading end, whereby as said center of gravity passes into said planetary end, said leading end is in contact with said weld fixture and axle shaft installation guide.

* * * * *